Figure 1:
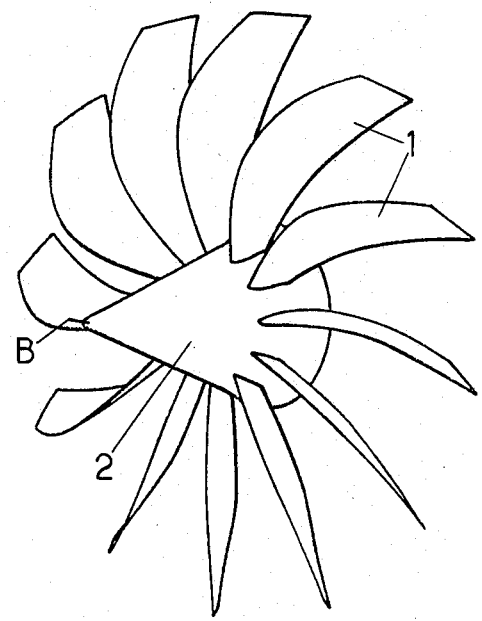

United States Patent [19]

Bousquet et al.

[11] Patent Number: 4,790,724

[45] Date of Patent: Dec. 13, 1988

[54] AERIAL PROPELLORS MORE ESPECIALLY FOR AIRCRAFT PROPULSIVE UNITS

[75] Inventors: Jean-Marc Bousquet, Paris; Alain Faubert, Voisins le Bretonneux; Georges Vingut, Marseille, all of France

[73] Assignee: Office National d'Etudes et de Recherche Aerospatiales, Chatillon Sous Bagneux, France

[21] Appl. No.: 105,210

[22] Filed: Oct. 7, 1987

[30] Foreign Application Priority Data

Oct. 24, 1986 [FR] France .................. 86 14826

[51] Int. Cl.[4] .............................. B64C 11/18
[52] U.S. Cl. .................. 416/223 R; 416/243; 416/DIG. 2
[58] Field of Search .................. 415/119, 181; 416/223 R, 228, 238, 242, 243, DIG. 2

[56] References Cited

U.S. PATENT DOCUMENTS

| 1,658,438 | 2/1928 | Hall | 416/DIG. 2 X |
|---|---|---|---|
| 1,929,690 | 10/1933 | Huntman | 416/238 |
| 2,043,736 | 6/1936 | Charavay | 416/DIG. 2 X |
| 3,972,646 | 8/1976 | Brown et al. | 415/119 X |
| 4,135,858 | 1/1979 | Entat | 416/238 X |
| 4,171,183 | 10/1979 | Cornell et al. | 416/223 R X |
| 4,358,246 | 11/1982 | Hanson et al. | 416/DIG. 2 X |
| 4,370,097 | 1/1983 | Hanson et al. | 416/223 R X |

FOREIGN PATENT DOCUMENTS 684161  6/1930  France .................. 416/228

Primary Examiner—Abraham Hershkovitz
Assistant Examiner—Joseph M. Pitko
Attorney, Agent, or Firm—Stevens, Davis, Miller & Mosher

[57] ABSTRACT

The mean line (F) of each blade (1) is formed by a flat continuous curve contained in a plane $OZ$-$OY_o$ forming with the plane of rotation of the propeller an angle $\phi_o$ between 35° and 55° and preferably between 40° and 50°, said curve having a first part of negative $Y_o$ and positive $Z$ coordinates, and a second part of positive $Y_o$ and positive $Z$ coordinates, the coordinate point $Y_o=0$ being situated between the values of $Z$ included between 0.75 and 0.85 R (R designating the radius of the propeller), the tangent to this curve has its end corresponding to the end of the blade forming with the axis $Oz$ an angle $\wedge$ between 30° and 50° and preferably between 35° and 45°.

3 Claims, 7 Drawing Sheets

AERIAL PROPELLORS MORE ESPECIALLY FOR AIRCRAFT PROPULSIVE UNITS

The present invention relates to aerial propellers, particularly for aircraft propulsive units.

It is known that the theoretical efficiency of a propeller, for a given disk loading $C=P/D^2$ (P being the power on the propeller shaft and D the diameter), increases with the rotational speed of the propeller. But the adoption of a high rotational speed comes up against a problem: the composition of the speed due to rotation of the propeller and the advancing speed of the aircraft leads to relative MACH numbers which increase progressively from the base of the blade to its end. In these conventional propellers, the MACH number frequently reaches values of the order of 0.9 even when the advancing speeds are moderate, of the order of $M=0.6$. At these relative high Mach numbers there already appear, on thin conventional profiles, intense shock waves causing lamina separation and leading to high loss levels. Consequently, the propulsive efficiency of conventional propellers decreases rapidly, at a given propeller speed, when the speed of the aircraft increases, which leads to replacing propulsive units using propellers by other types of units, particularly by turbojets, when the speed of the aircraft exceeds about $M=0.65$.

Considerable work has already been carried out to try and increase the field of use of propellers towards much higher Mach numbers.

Propellers have been proposed such as the one shown (in a perspective view) in FIG. 1 of the accompanying drawings; this propeller includes a large number of blades 1 (with a number of blades generally greater than 8), projecting from a cowling 2 joined to the engine nacelle (not shown).

The blades 1 of this propeller have a special shape in that their end is curved rearwardly, with regard to the direction of rotation of the propeller, and downstream, with respect to the plane of rotation of the propeller.

In the construction of propellers of this type design difficulties are met with (not only from the constructional point of view but also from the strength point of view) because of the crooked shape of the line along which the constituent profiles of each blade are distributed.

It is conventional to consider, in order to characterize the shape of a blade, the geometrical locus of the points M situated at a quarter of a chord (reckoned from the leading edge) of each profile, the curve thus generated being called hereafterwards mean line F of the blade.

In order to define this mean line, use is made of the following reference trihedron:
axis OX formed by the axis of rotation of the propeller;
axis OZ formed by the pivoting axis of the blade;
axis OY completing the trirectangular trihedron.

Figure 2:
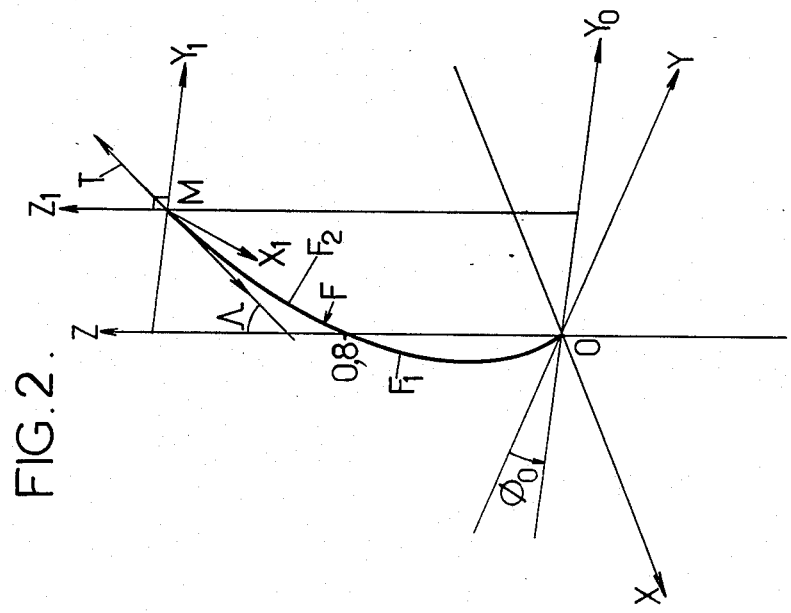

Since the end of each blade is curved downstream with respect to the plane of rotation of the propeller (plane OZ-OY), in order to define the mean line a plane is considered defined by axis OZ and an axis $OY_o$ forming with the axis OY an angle $\phi_o$ (FIG. 2).

With each point M there may then be associated a reference trihedron $MX_1$, $MY_1$, $MZ_1$ derived from the trihedron $OX_o$ $OY_o$ OZ by translation (FIG. 2).

Each profile is then defined in the plane $MX_1 MY_1$.

In accordance with the invention, the mean line F is characterized by the fact that it is formed by a flat continuous curve contained in a plane $OZ-OY_o$ forming with the plane of rotation of the propeller an angle $\phi_o$ between 35° and 55° and preferably between 40° and 50°, said curve having a first part of negative $Y_o$ and positive Z coordinates, and a second part of positive $Y_o$ and positive Z coordinates, the coordinate point $Y_o=0$ being situated between the values of Z included between 0.75 and 0.85 R (R designating the radius of the propeller), the tangent to this curve at its end corresponding to the end of the blade forming with the axis Oz an angle $\wedge$ between 30° and 50° and preferably between 35° and 45°.

In accordance with the invention, this curve may be defined by the following equation, in the plane $OZ$-$OY_o$:

$$Y_o/R = M_o + M_1(Z/R) + M_2(Z/R)^2 + M_3(Z/R)^3 + M_4(Z/R)^4$$

in which $0.05 < M_o \leq 0.015$; $0.1 < M_1 \leq 0.2$; $-2 < M_2 \leq -1$; $1.5 < M_3 \leq 3$; $-1 < M_4 \leq -0.5$ depending on the value of the angle $\wedge$ at the end of the blade which it is desired to obtain.

In a complementary arrangement of the invention, the blades, formed along the above defined mean line F, emerge from a cowling of a shape such that it causes local slowing down of the flow at the base of the blades.

This cowling is defined as a body of revolution generated by the rotation of a meridian line about the axis of rotation of the propeller, this meridian line being referenced by its coordinates X and Y plotted on the axis of rotation of the propeller and on a radial axis and referenced to the diameter of the propeller, namely:

$$X = (x/D)$$

$$Y = (r/D)$$

x designating the abscissa, r the radius and D the diameter of the propeller.

This meridian line is characterized by its curvature C defined by:

$$\frac{1}{C} = \frac{[1 + (dY/dX)^2]^{3/2}}{d^2Y/dX^2}$$

The position of the blades with respect to the cowling is referenced by the distance L separating the leading edge of the cowling and the plane of the blades defined as being the plane perpendicular to the axis of rotation of the propeller and passing through its center.

In accordance with this complementary arrangement, the blades leave a cowling at a distance L from the leading edge of the cowling, said cowling being defined by a meridian line having:

at its origin, forming the leading edge of the cowling, a maximum curvature greater than 15, between its origin and a first relative abscissa point $X=x/D$ equals 0.05, a curvature decreasing rapidly from the maximum value to about a value of 7, between the first point and a second point situated at a distance from the leading edge between 0.5 and 0.7 times the leading edge—blade plane distance L, a curvature decreasing substantially linearly from a value 7 to a value 0, between this second point and a third point situated in the plane of the blades, a curvature decreasing more slowly than said linear decrease, from value 0 to a minimum value between −3 and −5, between this third point and a fourth point situated in the rear plane of the cowling, a curvature increasing rapidly from the minimum value to a value of 0.

Advantageously the engine nacelle which is joined to the cowling has a meridian line extending that of the cowling and whose curvature increases from the value 0 to a value of about 3 at a relative distance of 0.10 to 0.15 downstream of the rear plane of the cowling, then a decrease from value 3 to a value of about 1 at a relative distance of 0.40 to 0.45 downstream of the rear plane of the cowling.

The invention consists, apart from the arrangements already discussed, of several other arrangements which are preferably used at the same time and which will be described in greater detail hereafter.

The invention may in any case be better understood from the complement of description and the accompanying drawings, which complement and drawings relate to preferred embodiments of the invention and comprise no limitative character.

Figure 5:
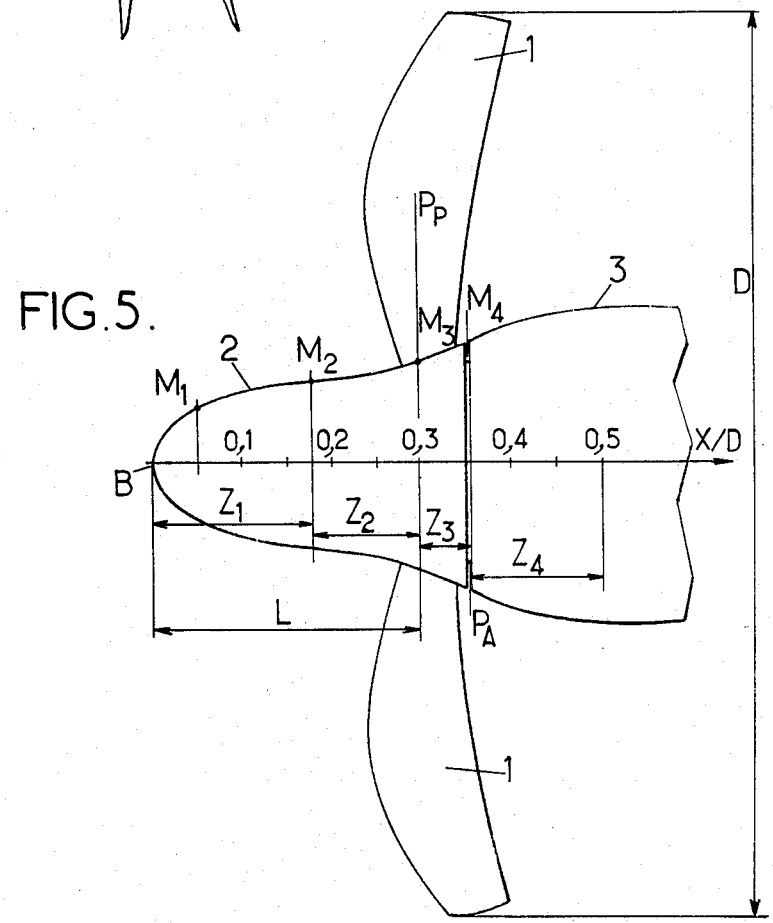
Figure 3:
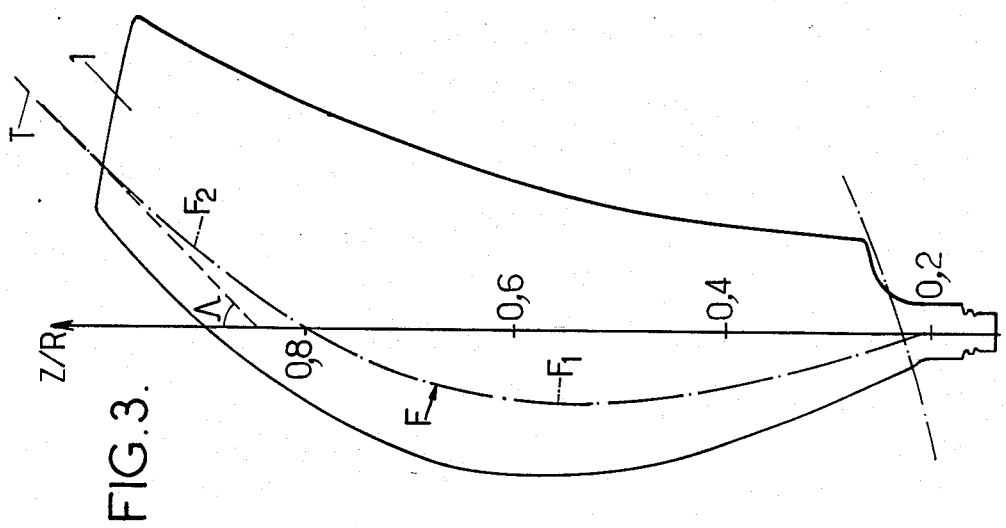
Figure 4:
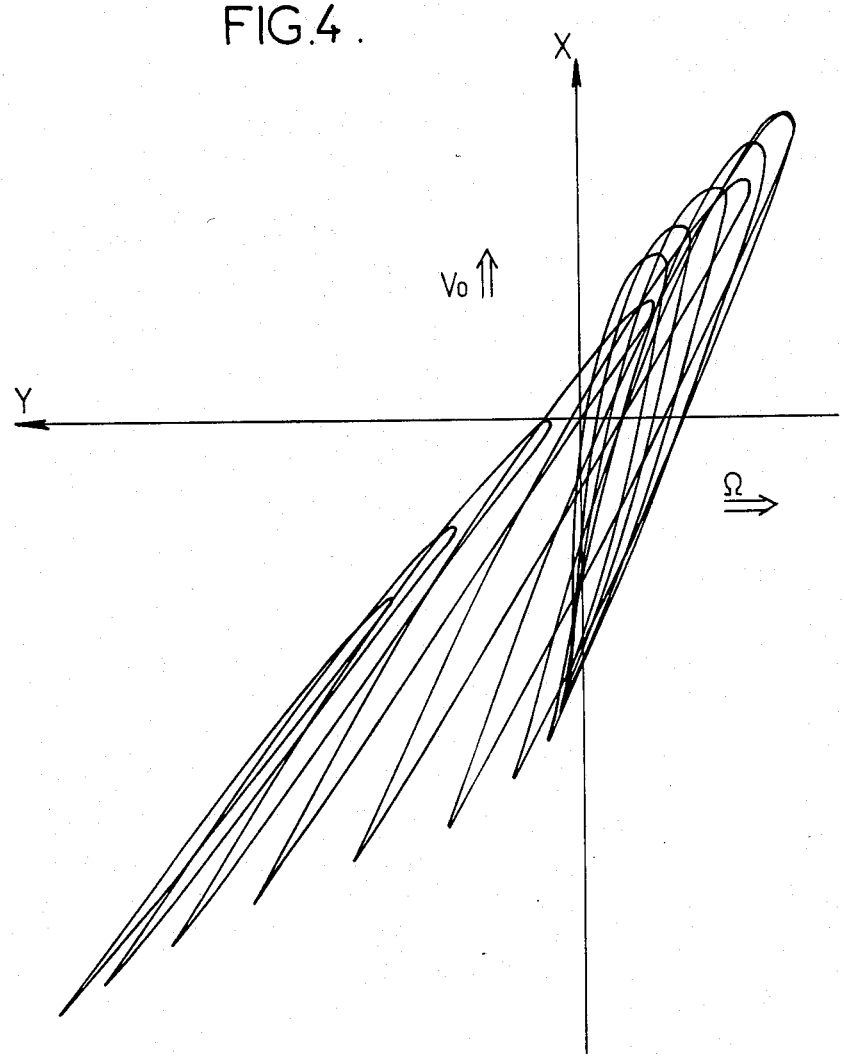
Figure 6:
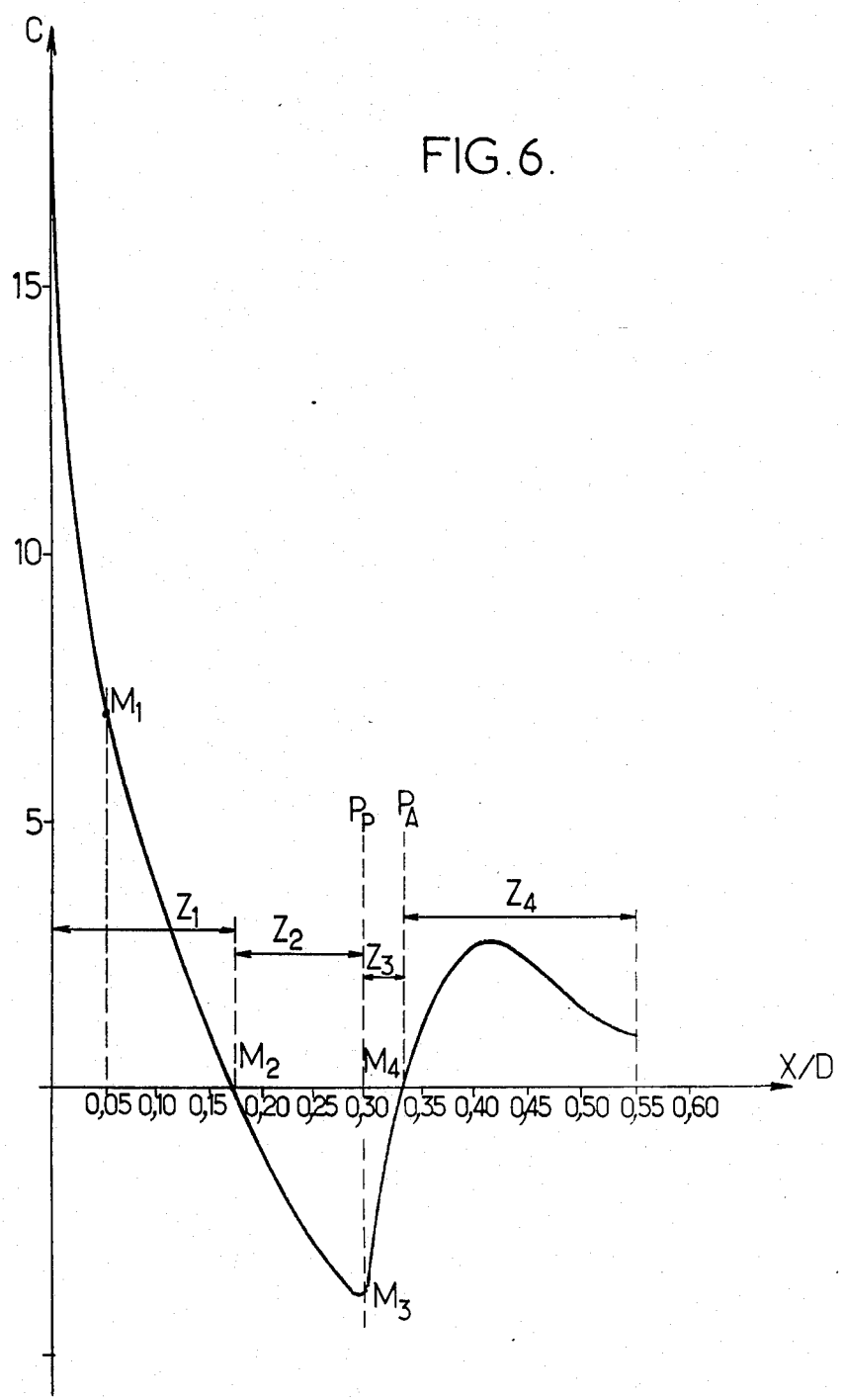
Figure 7:
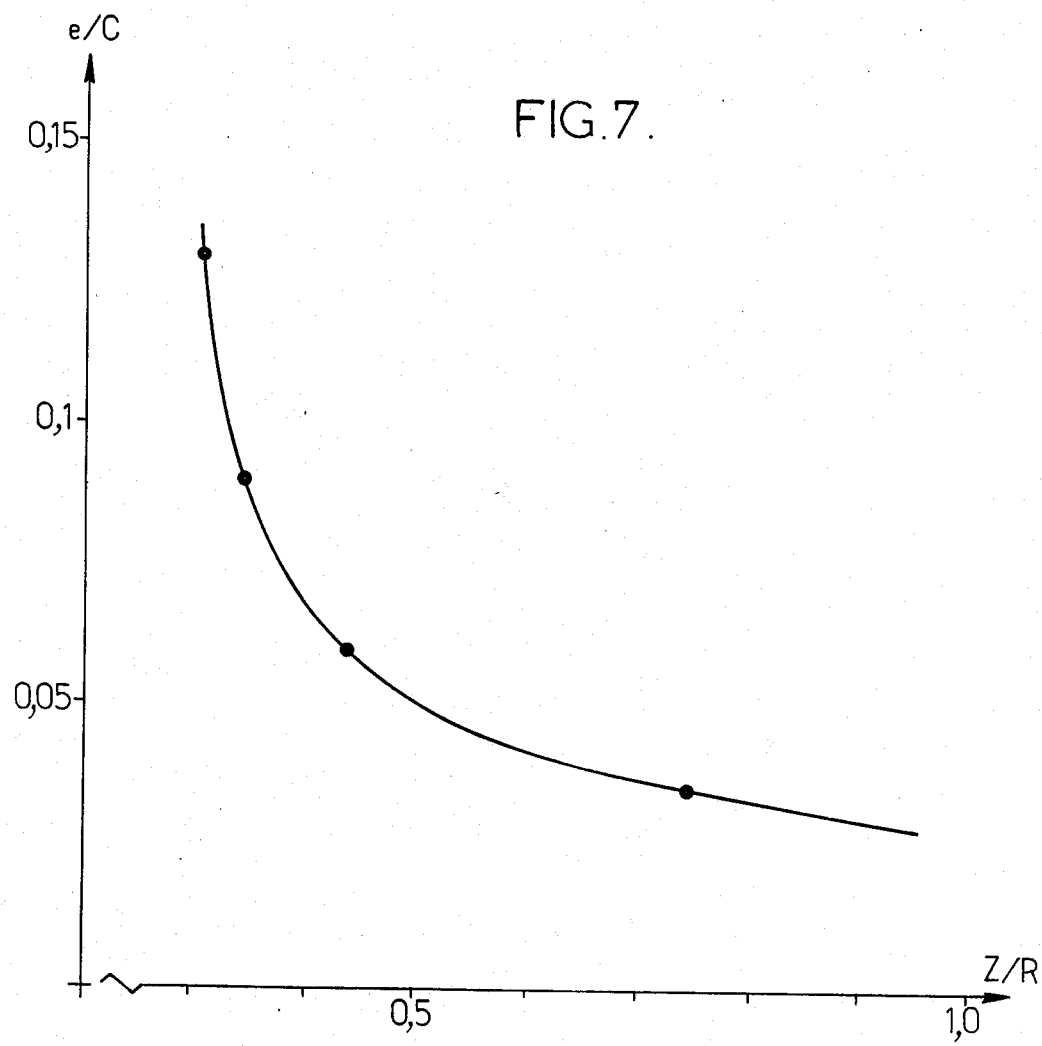
Figure 8:
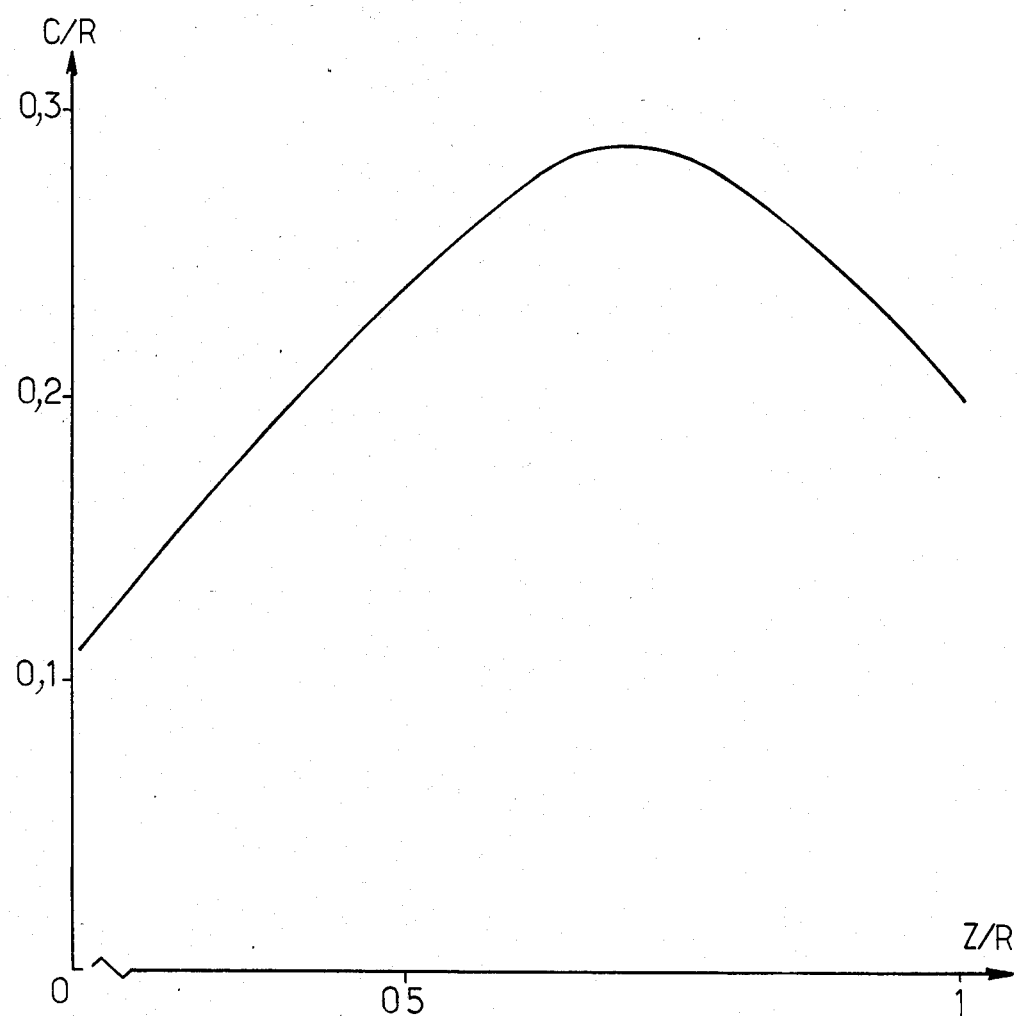
Figure 9:
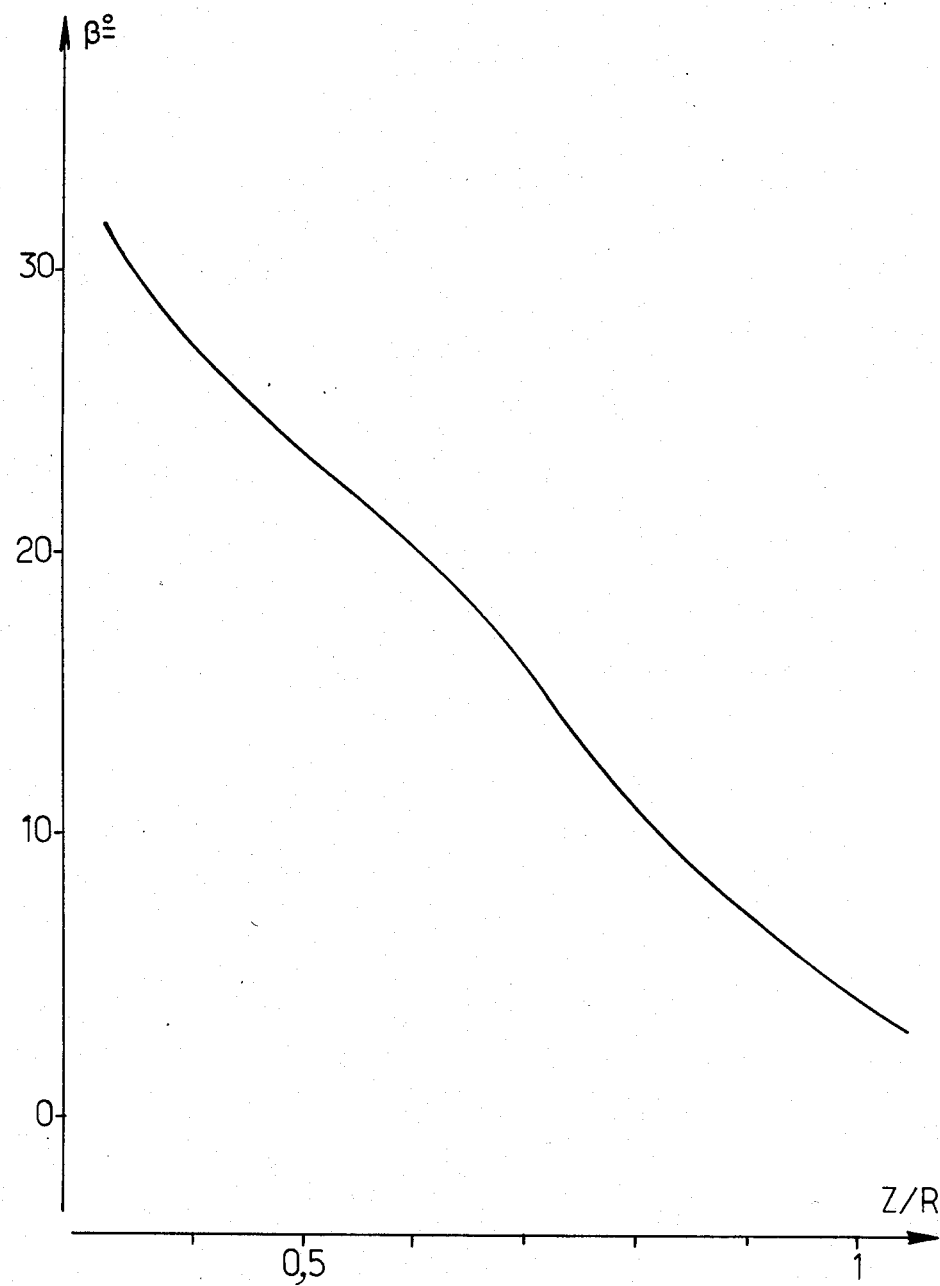

FIG. 1 is a perspective view of a propeller to which it is proposed to apply the improvements of the invention, FIG. 2 is a perspective view of the reference trihedron for defining a propeller of the invention, FIG. 3 is a view in a rotated plane of a propeller blade in accordance with the invention (untwisted blade), FIG. 4 is a view showing, in different cylindrical sections, at different radii, the different profiles of the propeller blade of the invention, FIG. 5 is a schematical section of a blade in accordance with the invention and whose cowling is formed in accordance with a complementary arrangement of the invention, FIG. 6 is a curve showing the evolution of the curvature of the cowling of the propeller shown in FIG. 5, FIG. 7 is a curve of relative thickness of one embodiment of a propeller blade in accordance with the invention, FIG. 8 is a curve of relative chords of the blade of FIG. 7, and FIG. 9 is a curve showing the twisting law of the blade of FIG. 7.

In accordance with the invention, the blade of the propeller is characterized by the fact that the geometrical locus of points M situated at a quarter of a chord (reckoned from the leading edge) of each profile is situated on a flat continuous curve F contained in a plane $OZ\text{-}OY_o$ forming with the plane of rotation of the propeller $OZ\text{-}OY$ an angle $\phi_o$ between 35° and 55° and preferably between 40° and 50°, said curve F having a first part $F_1$ of negative $Y_o$ and positive Z coordinates and a second part $F_2$ of positive $Y_o$ and positive Z coordinates, the coordinate point $Y_o=0$ being situated between the values of Z included between 0.75 and 0.85R (R designating the radius of the propeller), the tangent T to this curve F has its end E corresponding to the end of the blade forming with axis OZ an angle $\wedge$ between 30° and 50° and preferably between 35° and 45°.

In accordance with the invention, this curve is defined by the following equation, in the plane $OZ\text{-}OY_o$:

$$Y_o/R = M_o + M_1(Z/R) + M_2(Z/R)^2 + M_3(Z/R)^3 + M_4(Z/R)^4$$

in which $0.05 < M_o \leq 0.015$; $0.1 < M_1 \leq 0.2$; $-2 < M_2 \leq -1$; $1.5 < M_3 \leq 3$; $-1 < M_4 \leq -0.5$ depending on the value of the angle $\wedge$ at the end of the blade which it is desired to obtain.

FIG. 3 shows a view of a blade constructed in accordance with the invention, the blade being shown twisted.

In FIG. 4 the profiles of the blade have been shown by cylindrical sections made along the radii.

Referring to the above defined system of coordinates and to FIGS. 5 and 6, cowling 2 is defined by a meridian line having:

at its origin O, forming the leading edge B of the cowling, a maximum curvature greater than 15, between its origin O and a first point $M_1$ with relative abscissa $X = x/D$ equal to 0.05, a curvature decreasing rapidly from the maximum value to a value of about 7, between this first point M and a second point $M_2$ situated at a distance $L_2$ from the leading edge between 0.5 and 0.7 times the leading edge—blade plane distance L, a curvature decreasing substantially linearly from the value 7 to a value 0, between this second point $M_2$ and a third point $M_3$ situated in a plane of the blades $P_P$, a curvature decreasing more slowly than said linear decrease, from the value 0 to a minimum value between −3 and −5, between this third point $M_3$ and a fourth point $M_4$ situated in the rear plane $P_A$ of the cowling, a curvature increasing rapidly from the minimum value to the value of 0.

The cowling has then:

a first zone $Z_1$, between the leading edge B and the second point $M_2$, in which the curvature decreases first of all fairly rapidly from its maximum value to a value of about 7, then decreases less rapidly, from a value of about 7 to its zero value, a second zone $Z_2$ between the second point $M_2$ and the plane of the blades $P_P$, in which the curvature is negative and decreases even more slowly to its minimum value, and a third zone $Z_3$, between the plane of the blade and the rear plane $P_A$ of the cowling, in which the curvature increases rapidly from its minimum value to a zero value.

The engine nacelle 3 which is joined to cowling 2 has a meridian extending that of the cowling and whose curvature increases from value 0 to a value of about 3 at a relative distance of 0.1 to 0.15 downstream of the rear plane of the cowling, then decreases from the value 3 to a value of about 1 at a relative distance of 0.40 to 0.45 downstream of the rear plane of the cowling.

The engine nacelle has then a zone, called fourth zone $Z_4$, extending the last zone $Z_3$ of the cowling whose curvature varies fairly rapidly first of all increasing then decreasing.

This variant of the curvature of the meridian line forming the cowling of the propeller and the beginning of the engine nacelle is clearly shown in FIG. 3 in which the relative distances (X/D) reckoned along the axis of rotation of the propeller are plotted as abscissa and the curvature C as ordinates.

By way of example, the meridian line forming the cowling of the propeller and the beginning of the engine nacelle may be formed by the following curve sections, in the carthesian system X, Y in which $X=x/D$ and $Y=r/D$.

For $0 < X \leq 0.3$ $Y=0.3271995X^{\frac{1}{2}}-2.422616X^2+5.697069X^3$ — for $Y=0.3 \leq X \leq 0.55$ $Y=2.996639-38.21174X+200.4801X^2-538.7765X^3+794.8556X^4-615.5586X^5+196.3246X^6$ Another example gives, for the cowling and the engine nacelle, the meridian line defined in the table below which takes up point by point the coordinates of this line in the same carthesian system X, Y, the notation E∓W signifying 10∓W.

| X | Y |
|---|---|
| 0. | 0. |
| .1250000E−01 | .3621461E−01 |
| .2500000E−01 | .5030967E−01 |
| .3750000E−01 | .6025554E−01 |
| .5000000E−01 | .6781963E−01 |
| .6250000E−01 | .7372742E−01 |
| .7500000E−01 | .7838351E−01 |
| .8750000E−01 | .8205535E−01 |
| .1000000E+00 | .8494048E−01 |
| .1125000E+00 | .8719646E−01 |
| .1250000E+00 | .8895621E−01 |
| .1375000E+00 | .9033639E−01 |
| .1500000E+00 | .9144257E−01 |
| .1625000E+00 | .9237234E−01 |
| .1750000E+00 | .9321749E−01 |
| .1875000E+00 | .9406537E−01 |
| .2000000E+00 | .9499998E−01 |
| .2125000E+00 | .9610265E−01 |
| .2250000E+00 | .9745259E−01 |
| .2375000E+00 | .9912732E−01 |
| .2500000E+00 | .1012030E+00 |
| .2625000E+00 | .1037544E+00 |
| .2750000E+00 | .1068558E+00 |
| .2875000E+00 | .1105801E+00 |
| .3000000E+00 | .1150000E+00 |
| .3104167E+00 | .1192282E+00 |
| .3208333E+00 | .1237836E+00 |
| .3312500E+00 | .1284998E+00 |
| .3416667E+00 | .1332382E+00 |
| .3520833E+00 | .1378875E+00 |
| .3625000E+00 | .1423614E+00 |
| .3729167E+00 | .1465950E+00 |
| .3833333E+00 | .1505422E+00 |
| .3937500E+00 | .1541728E+00 |
| .4041667E+00 | .1574703E+00 |
| .4145833E+00 | .1604294E+00 |
| .4250000E+00 | .1630536E+00 |
| .4354167E+00 | .1653538E+00 |
| .4458333E+00 | .1673461E+00 |
| .4562500E+00 | .1690503E+00 |
| .4666667E+00 | .1704886E+00 |
| .4770833E+00 | .1716840E+00 |
| .4875000E+00 | .1726598E+00 |
| .4979167E+00 | .1734383E+00 |
| .5083333E+00 | .1740401E+00 |
| .5187500E+00 | .1744838E+00 |
| .5291667E+00 | .1747857E+00 |
| .5395833E+00 | .1749592E+00 |
| .5500000E+00 | .1750155E+00 |

Finally, and whatever the embodiment adopted, a propeller is obtained whose construction is simplified, not only from the constructional point of view, but also from the point of view of strength, in fact, the special shape given to the main line of the blades allows, on the one hand, easy construction of the blade, and, on the other hand, a better distribution of the masses favorable to an increased mechanical strength.

In addition, because of the shape of the cowling, the phenomena of blocking of the flow in the channels defined by the blade at the level of their bases are avoided. The efficiency of the propeller is therefore not diminished by shocks or lamina separation which such blocking phenomena risk causing: the propeller may then be used at high Mach numbers (greater than 0.65) with performances comparable to those of propellers defined for usual Mach numbers in propeller propulsion where they have efficiencies in the region of or greater than 0.8.

By way of example, the comparative results of tests on a propeller in accordance with the invention are given hereafter.

A propeller has twelve blades and a cowling in accordance with the complementary arrangement of the invention.

Each blade of the propeller as shown in FIG. 3, shown before twisting, includes the following profiles distributed over the span Z of the blade:

at 0.2 R at the foot of the blade, a circular profile carrying the blade and allowing its angular rotation, at 0.3 R, a profile of relative thickness $e/c=13\%$, at 0.5 R, a profile of relative thickness $e/c=9\%$, at 0.7 R, a profile of relative thickness $e/c=6\%$, at 0.9 R, a profile of relative thickness $e/c=3.5\%$.

The above indicated profiles form particular points of the relative thickness law shown in FIG. 7. They are established in a way known per se for application to transonic propellers.

Towards the base of the blade, the profile of relative thickness $e/c=13\%$ is connected progressively as far as the intersection with the cowling where it takes on the shape thereof.

The blade is further characterized by a law of relative chords C/R as a function of Z/R shown in FIG. 8, and a twisting law $\beta$ as a function of Z/R shown in FIG. 9.

The table below gives the results of wind tunnel tests of a propeller HT3 in accordance with the invention having 12 blades. This table gives for four characteristic Mach numbers of flight of the aircraft, for a given advance parameter ($\gamma$) and a given power coefficient ($\psi$) the net efficiency of a propeller HT3 in accordance with the invention.

The results of the propeller HT3 are compared with the results of published tests of high speed American propellers SR1 and SR3 having eight blades equipped with conventional NACA profiles 16. The results are taken from the documents N.A.S.A.—CR 3047 and N.A.S.A.—CR 3505 for the high speed tests of the propellers SR1 and SR3 and from a document A.I.A.A. 85-1259 for the low speeds of the propeller SR3.

The table shows that the propeller of the invention has the advantage of performances superior not only to the high Mach cruising numbers but also to the low Mach numbers, corresponding to take off and to the climbing phase of the aircraft.

| | Net efficiency | | |
|---|---|---|---|
| | Propeller HT3 | Propeller SR1 | Propeller SR1 |
| M = 0.25 $\gamma = 1.24$ $\psi = 1.43$ | 0.633 | 0.540 | 0.590 |
| M = 0.5 $\gamma = 2.3$ $\psi = 1.4$ | 0.834 | 0.775 | 0.780 |
| M = 0.7 $\gamma = 3.12$ $\psi = 1.82$ | 0.807 | 0.795 | 0.800 |
| M = 0.75 $\gamma = 3.12$ $\psi = 1.82$ | 0.796 | 0.780 | 0.792 |

What we claim is:

1. An aerial propeller, particularly for an aircraft propulsive unit, having a plurality of blades, each blade having a mean line, said mean line defined using a reference trihedron constituted by axis OX formed by the axis of rotation of the propeller, axis OZ formed by the pivoting axis of the blade and axis OY completing the trirectangular trihedron, wherein said mean line is formed by a flat continuous curve contained in a plane $OZ$-$OY_o$ forming with the plane of rotation of the propeller an angle $0_o$ between 35° and 55° and preferably between 40° and 50°, said curve having a first part of negative $Y_o$ and positive Z coordinates, and a second part of positive $Y_o$ and positive Z coordinates, the coordinate point $Y_o=0$ being situated between the values of Z included between 0.75 and 0.85 R (R designating the radius of the propeller), the tangent to this curve has its end corresponding to the end of the blade forming with the axis Oz and angle $\wedge$ between 30° and 50° and preferably between 35° and 45°.

2. A propeller according to claim 1, wherein said mean line is defined by the following equation, in the plane $OZ$-$OY_o$:

$$Y_o/R = M_o + M_1(Z/R) + M_2(Z/R)^2 + M_3(Z/R)^3 + M_4(Z/R)^4$$

in which $0.05 < M_o \leq 0.015$;  $0.1 < M_1 \leq 0.2$;  $-2 < M_2 \leq -1$;
$1.5 < M_3 \leq 3$;  $-1 < M_4 \leq -0.5$.

3. A propeller according to claim 1 including the following profiles:
at 0.3 R, a profile of relative thickness $e/c = 13\%$,
at 0.5 R, a profile of relative thickness $e/c = 9\%$,
at 0.7 R, a profile of relative thickness $e/c = 6\%$,
at 0.9 R, a profile of relative thickness $e/c = 3.5\%$,
the profile of thickness $e/c = 13\%$ being connected progressively towards the base as far as the intersection with the cowling where it takes on the shape thereof.

* * * * *